United States Patent [19]

Hillestad

[11] Patent Number: 4,620,823

[45] Date of Patent: * Nov. 4, 1986

[54] PORTABLE TUBE MILLING TOOL

[76] Inventor: Tollief O. Hillestad, 2930 Seville Rd., Rittman, Ohio 44270

[*] Notice: The portion of the term of this patent subsequent to May 22, 2001 has been disclaimed.

[21] Appl. No.: 402,838

[22] Filed: Jul. 29, 1982

Related U.S. Application Data

[63] Continuation-in-part of Ser. No. 213,814, Dec. 8, 1980.

[51] Int. Cl.[4] .................................................. B23C 3/02
[52] U.S. Cl. .................................. 409/178; 409/183; 408/82; 408/104; 82/4 C
[58] Field of Search ................ 82/4 C, 1.2; 409/138, 409/183, 185, 189, 192, 197, 201, 205, 65, 178, 175, 180, 181, 179; 408/138, 65, 205, 201, 197, 192, 189, 185, 70, 71, 72, 82, 104, 136, 137; 279/2 R, 47

[56] References Cited

U.S. PATENT DOCUMENTS

| 2,712,273 | 7/1955 | Rusnok | 409/185 |
| 3,051,059 | 8/1962 | Davey | 409/178 |
| 3,434,709 | 3/1969 | Ramsay | 279/2 |
| 3,512,433 | 11/1967 | Juhasz et al. | 408/138 |
| 3,638,979 | 2/1972 | Francois et al. | 279/2 |
| 3,875,832 | 4/1975 | Mayfield | 82/4 C |
| 4,182,588 | 1/1980 | Burkart et al. | 408/137 |
| 4,236,428 | 12/1980 | Feamster, III | 82/4 C |
| 4,257,289 | 3/1981 | Groothius | 144/205 |
| 4,449,871 | 5/1984 | Hillestad | 408/137 |
| 4,470,734 | 9/1984 | Miller | 408/82 |
| 4,480,700 | 11/1984 | Krieger et al. | 409/185 |
| 4,498,820 | 2/1985 | Brennan | 408/82 |
| 4,507,030 | 3/1985 | Jackson | 409/185 |

Primary Examiner—Gil Weidenfeld
Assistant Examiner—Thomas M. Kline
Attorney, Agent, or Firm—Sand & Hudak Co.

[57] ABSTRACT

A portable milling tool for milling pipes, tubes, cylinders, and the like has a collet at one end thereof for securing and centering the tool to the work piece. An adjustable in-line rod connects the collet to the tool and permits the collet to secure or release the work piece. An in-line shaft moves the tool into or out of engagement with the work piece. The tool is of compact design allowing it to be used in on-site situations wherein tool size is a problem.

9 Claims, 5 Drawing Figures

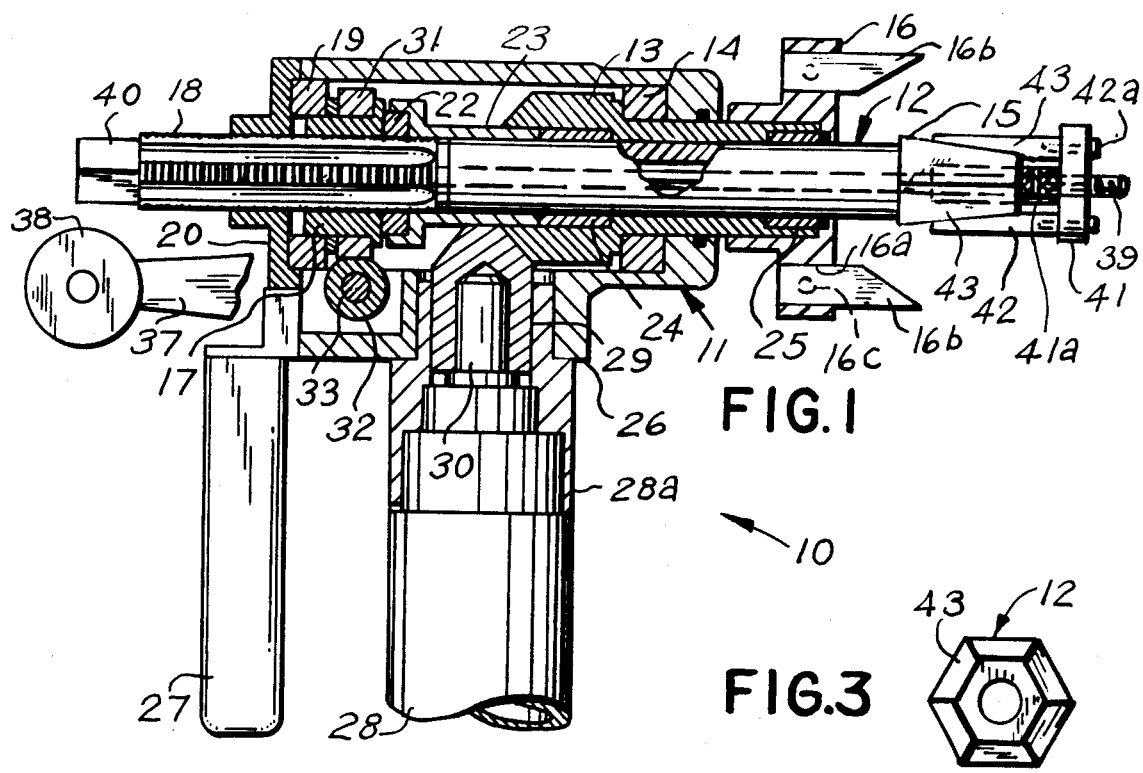
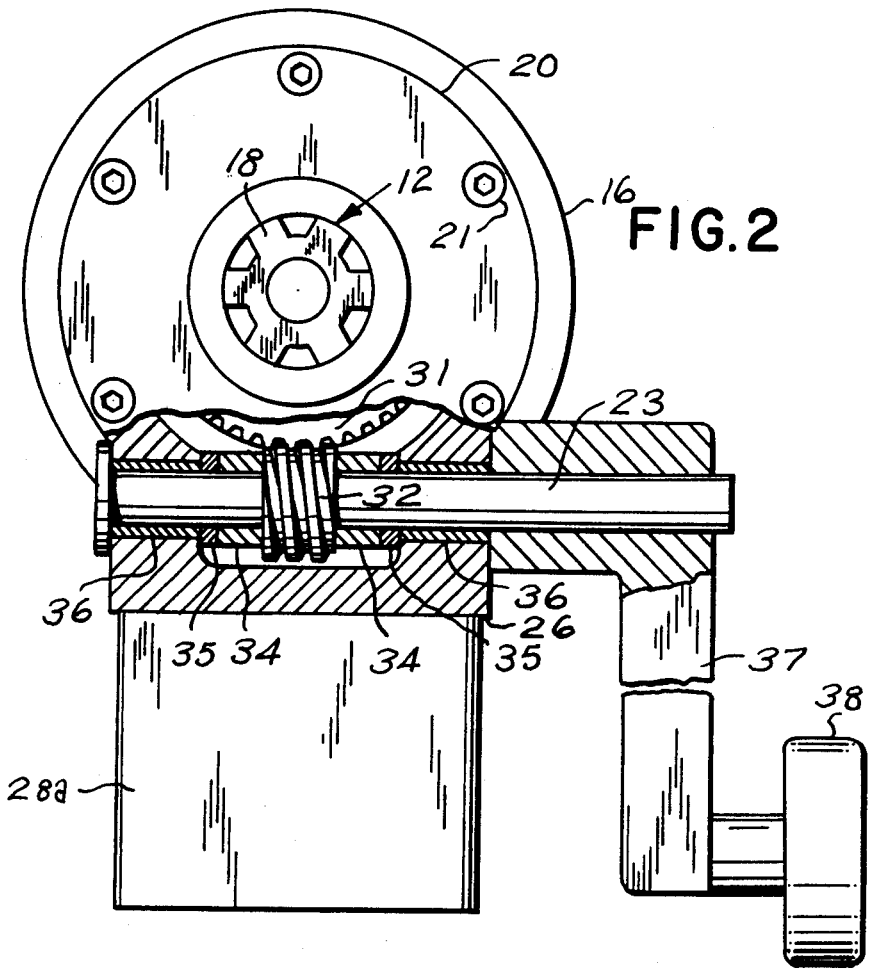

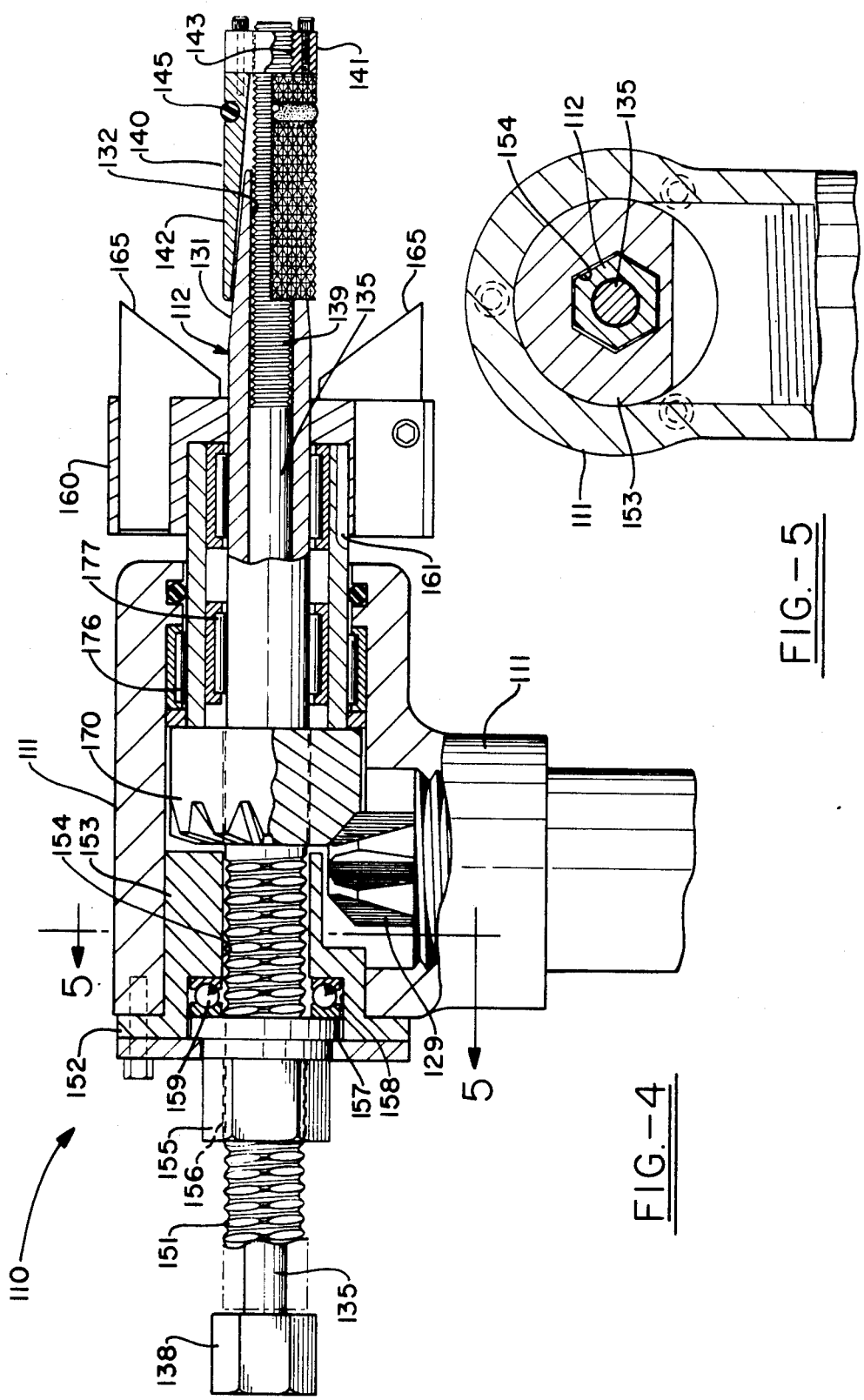

PORTABLE TUBE MILLING TOOL

CROSS-REFERENCE

This application is a continuation-in-part of my earlier application bearing U.S. Ser. No. 213,814 which was filed on Dec. 8, 1980, for "Portable Tube Milling Tool."

TECHNICAL FIELD

This invention relates to portable powered tools, and more particularly to a portable tube milling tool. More specifically, the portable milling tube of the present invention has a pneumatic drive source. An in-line adjustable rod enables a collet to be moved forward or backward to engage or disengage a work piece.

BACKGROUND ART

Heretofore, milling tools have largely been of the standard or conventional fixed or stationary type. That is, the milling machine was usually bolted or secured to the floor of a machine shop or factory and the work piece was brought to the machine for milling. With regard to work pieces which were brought from an outside location, use of the conventional stationary milling machines was costly, time consuming, and impractical. In order to alleviate this problem, hand grinders were utilized to grind the ends of the work piece to a desired shape. Not only was this method time consuming in that it required a few hours per item, but also expensive.

The present invention relates to a portable milling tool which can mill an item in approximately a few minutes.

DISCLOSURE OF INVENTION

It is therefore an aspect of the present invention to provide a portable milling tool having an in-line adjusting rod to engage or release a work piece.

It is yet another aspect of the present invention to provide a portable milling tool, as above, which is of compact size and can be used in the field or on the job site.

It is yet another aspect of the present invention to provide a portable milling tool, as above, in which an expandable collet is attached to one end of said adjusting rod.

It is yet another aspect of the present invention to provide a portable milling tool, as above, in which said expandable collet is fully rounded and resides upon a tapered shaft.

It is yet another aspect of the present invention to provide a portable milling tool, as above, wherein said expandable collet is expanded upon said tapered shaft so that it engages and centers a work piece such as a pipe, a tube, and the like.

It is yet another aspect of the present invention to provide a portable milling tool, as above, wherein said tapered shaft is adjustable forward or backward.

It is yet another aspect of the present invention to provide a portable milling tool, as above, wherein said tool is pneumatically driven and wherein the pneumatic motor is attached to said tool.

It is yet another aspect of the present invention to provide a portable milling tool, as above, wherein said shaft axially moves the tool into or out of engagement with the work piece.

It is yet another aspect of the present invention to provide a portable milling tool, as above, wherein said tube can be fastened to an on-site tube, for example, a boiler tube and mill the end of the boiler tube while located within a boiler.

These and other aspects of the present invention will become apparent from the following specification which describes in detail the present invention.

In general, a portable milling tool, comprising: a housing, said housing having a shaft extending through a portion thereof, one end of said shaft being tapered; a collet means for securing a work piece, said collet means residing upon said tapered shaft; said remaining end of said shaft extending through another portion of said housing and having a feed nut means for causing said shaft to move forward or backward.

BRIEF DESCRIPTION OF DRAWINGS

For a brief understanding of the present invention, reference is made to the attached drawings herein which forms a part of the specification and wherein:

FIG. 1 is a fragmentary side elevational view of a milling tool shown partly broken away;

FIG. 2 is an enlarged fragmentary left end view of FIG. 1, shown in elevation;

FIG. 3 is an enlarged right end view of the center shaft of FIG. 1, shown in elevation, with the collet and rod combination removed therefrom, for the sake of clarity;

FIG. 4 is a partial cross-section elevational side view of an improved tool according to the present invention; and FIG. 5 is a cross-sectional view taken on line 5—5 of FIG. 4.

BEST MODE FOR CARRYING OUT THE INVENTION

According to FIG. 1, a tool 10 is shown to include a housing 11, having, on its interior, a center shaft 12 positioned on its longitudinal axis. Shaft 12 is freely received in drive gear 13, and drive gear 13 is journalled in bearing 14, in the forward end of housing 11. Center shaft 12 is hollow, and includes a tapered hexagonal head 15, which extends forward of a tool holder 16, that is fixedly secured to gear 13, in a suitable manner (not shown). Shaft 12 provides a means of centering tool 10 with the longitudinal axis of a boiler tube (not shown). Shaft 12 provides a means of centering tool 10 with the longitudinal axis of a boiler tube (not shown), and tool holder 16 includes a plurality of broached, square openings 16a, which are equally and radially spaced apart, so as to receive cutting blades 16b, that are secured in holder 16 by setscrew 16c means. A feed nut 17 is received on the splined and threaded end 18 of center shaft 12, and is supported in bearing 19, in the end of housing 11, which is capped by a closure cap 20, secured to housing 11, by a plurality of suitable fasteners 21. A support bearing 22 is received on the splined end 18 of center shaft 12, within a spacer sleeve 23, and a bearing 24 is received within drive gear 13 at one end, for supporting gear 13 on center shaft 12. A bearing 25 is also received in the opposite end of drive gear 13, for supporting gear 13 on shaft 12.

To the bottom 26, which is integral with housing 11, is a handle grip 27, secured thereto in a suitable manner, for the operator to hold tool 10, and an air driven motor 28 is suitably secured to housing 11 by an adapter 28a, in a manner not shown. A pinion gear 29 is suitably secured to the shaft 30 of motor 28, and pinion gear 29 engages with drive gear 13, so as to rotate it on its attached tool holder 16.

A gear 31, on the outer periphery of feed nut 17, engages with worm gear 32, fixedly secured to crank shaft 33, mounted in the bottom 26 of housing 11. A pair of bearings 34, between a pair of spacers 35, and a pair of end bearings 36, mounted in the bottom 26 of housing 11, provide common support means for the crank shaft 33. Crank shaft 33 is fixedly secured, in a suitable manner (not shown), within crank handle 37, which includes a rotatable knob 38.

A rod 39, threaded at one end, and having a head 40 at its opposite end, is received within the hollow shaft 12. The head 40 abuts with splined end 18 of shaft 12, and the threaded end is threadingly received in the center of collet 41, which includes a knurled shank 41a, received in the end of head 15 of shaft 12. A plurality of jaws 42 are secured to collet 41, by suitable fasteners 42a, and jaws 42 grippingly engage the faces 43 of the tapered hexagonal head 15. The collet 41 and rod 39 combination serves as a means of locking tool 10 in the boiler tube that is to be machined.

In use, tool 10 is locked into the end of a boiler tube by means of the collet 41, which, by expanding on the inside of the tube, will automatically center it, when motor 28 is turned on, and, through the crank handle 37, shaft 33, the gears 31 and 32, a slow feed rotation of tool holder 16 is attained. Motor 28, through gear 29, rotates drive gear 13, which rotates tool holder 16 to machine a boiler tube, and the crank handle 37 rotates the feed nut 17, to advance or retract shaft 12 in housing 11, thus urging tool holder 16 forward or backward in controlling the cutting operation.

The present invention also relates to an improved portable milling tool as shown in FIGS. 4 and 5. Such improved tool is very compact and yet efficient and can be utilized on the job site and actually on the tube, pipe, etc., without removing said tube, pipe, etc. from its surrounding environment.

The portable milling tool is generally indicated by the numeral 110. Tool 110 has a housing 111. A shaft, generally indicated by the numeral 112, extends through housing 111 and extends from both ends thereof. One portion of the shaft is tapered at 131 for engagement with a collet. The taper can range from about 2 to about 15 degrees and preferably is about 5 degrees. Shaft 112 is hollow throughout, that is has a bore 132 which extends therethrough. A rod 135 extends throughout entire shaft bore 132 and has a knob or head portion 138. Generally such head portion is of a convenient design such that it can be turned by a torque providing tool, as for example a wrench and the like. Rod 135 at its forward end has threads 139.

A collet residing on tapered shaft 131 is generally indicated by the number 140. Collet 140 has a pair of tapered jaws 142 which have serrations on the outside thereof to form a gripping surface. Since taper 131 is fully rounded, jaws 142 have an arcual internal surface. The taper of jaws 142 can be at any angle such as from about 2 to about 15 degrees and desirably is about 5 degrees. The jaws are attached to collet head portion 141 through any conventional fastening means such as screws and the like. Collet head 141 has internal threads 143 therein which matingly engage threads 139 of the rod. In order to maintain the jaws so that they are seated upon shaft taper 136, a resilient fastening means 145, such as an "O" ring is utilized. Collet 140 is moved either forward or backward, that is away from or towards housing 111, respectively, by turning knob 138 in one direction or another. Thus, through turning of knob 138, rod 135 is also turned. This causes collet 140 through engagement of rod threads 139 with collet threads 143 to either ride up or down tapered shaft 131. Thus, when collet 140 is desired to be attached to the internal portion of a work piece, for example, a tube, pipe, etc., knobhead 138 is merely rotated in the proper direction causing the collet to ride up tapered shaft 136 and to expand the diameter of the serrated surfaces thereof. Upon being drawn backward a sufficient amount, jaws 142 will engage the internal surfaces of a work piece, not shown, automatically center it, and form a firm grip or securement therewith. Of course, any size shaft 131 and collet 140 can be utilized to engage and secure a correspondingly sized tube, pipe, etc.

As shown in FIG. 4, shaft 112 extends through the entire tool housing 111. The remaining or rear section of shaft 112 has threads 151 thereon. These threads extend along a sufficient portion of the shaft so that they extend into housing 111. Flange 152 resides on the housing and is connected thereto with any conventional fastener means such as screws. Flange 152 is integral with or connected to internal shaft guide 153. Hence, shaft guide 153 does not rotate. As best seen in FIG. 5, guide 153 has a hexagonal bore 154 which matingly engages the rear section of shaft 112 which is also hexagonal and has threads 151 thereon. Feed nut 155 has internal threads 156 which matingly engage said rear shaft hexagonal threads 151. Feed nut flange 157 also matingly engages bearing recess 158 of said internal shaft guide 153. Thus, through turning of feed nut 155, shaft 112 is forced either forwardly or rearwardly into or out of the housing. Due to the existence of ball bearings 159, feed nut 155 and flange 157 thereof are permitted to freely rotate within the housing when feed nut 155 is rotated. Shaft 112, however, does not rotate but moves axially forward or rearward through the hexagonal engagement with internal shaft guide 153, since contact of feed nut threads 156 with shaft threads 151 forces the shaft either into or out of the rear portion of the tool. This provision of moving shaft 112 either forward or rearwardly provides contact or disengagement of the work piece with milling head 160. Should the work piece be stationary, rotation of feed nut 155 will cause tool 110 to be moved forward or backward. Feed nut 155 can be rotated by any conventional torque item such as a wrench to slowly draw the work piece or the tool into further contact with milling head 160.

A conventional pneumatically driven motor, not shown, can be attached to the bottom of housing 111. The pneumatic motor through pinion gear 129 engages drive gear 170. Bearings 176 permit drive gear 170 to freely rotate within housing 111. Similarly, bearings 177 permit the drive gear to freely rotate around the shaft. The drive gear is connected to milling head 160 as through keyways 161 or any conventional fastening device. Milling head 160 can be of any conventional design and have cutting edges 165 therein as made from tool type hardened steel.

The utilization of the portable milling tool is as follows. The tool with the forward portion of shaft 112 and collet 140 is inserted into a work piece such as a tube. Knobhead 138 is rotated to cause collet jaws 142 to move rearwardly or backward along shaft taper 131 and to expand into the inside of the tube. Rotation of knob 138 is continued until a tight and secured fit is obtained. Such operation automatically centers the tube and obtains a tight securement between collet 140 and the tube. An air motor, not shown, is then initiated. Pinion gear 129 drives main gear 170 which in turn causes milling head 160 to rotate. Feed nut 155 is then rotated to cause the work piece to engage milling cutting edges 165. Draw nut 155 is continued to be rotated until a sufficient degree and amount of milling of the tube has occurred. Naturally, cutting edges 165 may be at any desirable angle. Moreover, they can be of a specific configuration such as to form an offset on a particular work piece. Once a sufficient milling operation has been finished, feed nut 155 is rotated in the opposite direction, thereby withdrawing the work piece from it. Knob 138 is then rotated in a direction to cause collet 140 to move forward and thereby releasing tool 110 from the work piece.

According to the structure of the present invention, a very rapid milling operation is conducted upon a work piece such as a tube, a pipe, a conduit, and the like. The feature of the expandable collet ensures that the work piece or tool is automatically centered. Moreover, the provision of in-line rod 135 as well as in-line shaft 112 permits a very small tool housing to be utilized. Accordingly, a very compact portable milling tool can be constructed according to the present invention. Thus, it can be utilized in numerous situations with regard to various in-the-field or on-job-site work pieces. A specific use involves the milling of boiler tube ends actually located within a boiler. Due to the compact size of tool 110, it can be inserted within the tube end with collet 140 engaging the inside portion of the tube. As feed nut 155 is rotated, milling head 150 (and the entire tool) is caused to be moved towards the tube end. Such an operation saves immensurable costs in that the boiler tubes need not be removed and that the milling occurs actually within the boiler. After the operation is conducted, the tube ends can be welded together to obtain a secure and strong fitting. Moreover, due to the taper of milled tube, a much better weld is obtained.

Although the present invention finds particular use with regard to milling boiler tube ends, it is to be understood that it can be used in numerous types of operations whenever a work piece requires that an end thereof be milled. For example, the present tool permits header to be installed in boilers. Additionally, the tool can be used to remove various seal welds from various types of pipes, tubes, etc. The invention can also be utilized in the chemical industry, the petroleum industry, or wherever an on-site tube milling operation is desired.

While in accordance with the patent statutes, a best mode and a preferred embodiment has been described in detail, the scope of the invention is set forth by the scope of the attached claims.

What is claimed is:
1. A portable milling tool, comprising:
a housing, said housing substantially enclosing an internal shaft guide, a pinion gear and drive gear, said housing further having a shaft extending through a portion thereof, one end of said shaft being tapered, said shaft having a remaining end portion;
a collet means for securing a work piece, said collet means residing upon said tapered shaft;
said remaining end of said shaft extending through another portion of said housing and having a feed nut means for causing said shaft to move forward or backward with respect to said housing and said shaft guide, said shaft guide having a bore therein, said remaining shaft end matingly engaging said bore of said shaft guide in an axial direction, said shaft being incapable of rotation in said bore of said shaft guide;
said pinion gear connected to said drive gear,
means for mounting said drive gear for rotation within said housing coaxially with and axially spaced apart from said shaft guide, and a milling head, said drive gear connected to said milling head.

2. A portable milling tool according to claim 1, wherein said shaft feed nut means matingly engages said remaining end portion of said shaft, and rotation of said shaft feed nut means causes said shaft to move axially forward or backward.

3. A portable milling tool according to claim 2, including a rod, said rod extending through said housing, said collet means attached to one end of said rod and having expandable jaws.

4. A portable milling tool according to claim 3, wherein said rod has a remaining end, said remaining end of said rod has a knob thereon, whereby movement of said rod causes said collet jaws to move along said tapered shaft and expand or contract.

5. A portable milling tool according to claim 4, wherein said shaft has a bore, and said rod extends through said shaft bore.

6. A portable milling tool according to claim 5, wherein said collet jaws are arcual and wherein said shaft taper is circular, and wherein said shaft taper is about 2 degrees to about 15 degrees.

7. A portable milling tool, according to claim 6, including a pneumatic motor, said pneumatic motor connected to said pinion gear.

8. A portable milling tool, according to claim 1, wherein said bore of said shaft guide and said remaining shaft end are hexagonal.

9. A portable milling tool, according to claim 7, wherein said bore of said shaft guide and said remaining shaft end are hexagonal.

* * * * *